United States Patent [19]

Huyer

[11] Patent Number: 5,259,662
[45] Date of Patent: Nov. 9, 1993

[54] TILT-SLIDING ROOF FOR A VEHICLE

[75] Inventor: Johannes N. Huyer, Velserbroek, Netherlands

[73] Assignee: Vermeulen-Hollandia Octrooien II B.V., Netherlands

[21] Appl. No.: 892,756

[22] Filed: Jun. 3, 1992

[30] Foreign Application Priority Data

Jun. 6, 1991 [NL] Netherlands ............ 9100972

[51] Int. Cl.$^5$ ............................ B60J 7/05
[52] U.S. Cl. ......................... 296/221; 296/223
[58] Field of Search ................. 296/216, 221-223

[56] References Cited

U.S. PATENT DOCUMENTS

| | | | |
|---|---|---|---|
| 4,741,573 | 5/1988 | Yokota | 296/221 |
| 4,844,532 | 7/1989 | Ono et al. | 296/213 |
| 4,971,386 | 11/1990 | Bohm et al. | 296/213 |
| 5,028,090 | 7/1991 | Huyer | 296/221 |
| 5,040,845 | 8/1991 | Huyer | 296/222 |
| 5,085,622 | 2/1992 | Kohlpaintner et al. | 296/222 |
| 5,092,651 | 3/1992 | Baldwin | 296/223 |

FOREIGN PATENT DOCUMENTS

| | | |
|---|---|---|
| 0352461 | 1/1990 | European Pat. Off. ........ 296/221 |
| 0468587 | 1/1992 | European Pat. Off. ........ 296/221 |
| 3824942C1 | 10/1989 | Fed. Rep. of Germany . |
| 3825193A1 | 2/1990 | Fed. Rep. of Germany . |
| 2495067 | 11/1981 | France . |
| 2090630A | 7/1992 | United Kingdom . |

Primary Examiner—Dennis H. Pedder
Attorney, Agent, or Firm—Kinney & Lange

[57] ABSTRACT

Tilt-sliding roof for a vehicle having an opening (2) in its fixed roof (1), comprising a rigid panel (3) supported near its front side by a front support having a transverse pivot (8) and being displaceable within a guide rail (6). At a distance behind this front support there is a set-out mechanism (5) connected with a driving slide (14) and adapted to adjust the panel in vertical direction. An operating-element engaging said driving slide is provided to operate the panel. The set-out mechanism comprises a set-out arm (15) arranged between the panel and the driving slide and including a guide slot (18), said set-out arm being connected to the panel on one end and to the driving slide on the other end in a pivotable, or slidable manner, respectively, and said arm swivelling in vertical direction to move the panel in vertical direction. The set-out mechanism further comprises a lever (16) to support the panel at least in upwardly tilted positions thereof, and an adjusting element (14) for erecting said lever to tilt the panel upwardly.

11 Claims, 4 Drawing Sheets

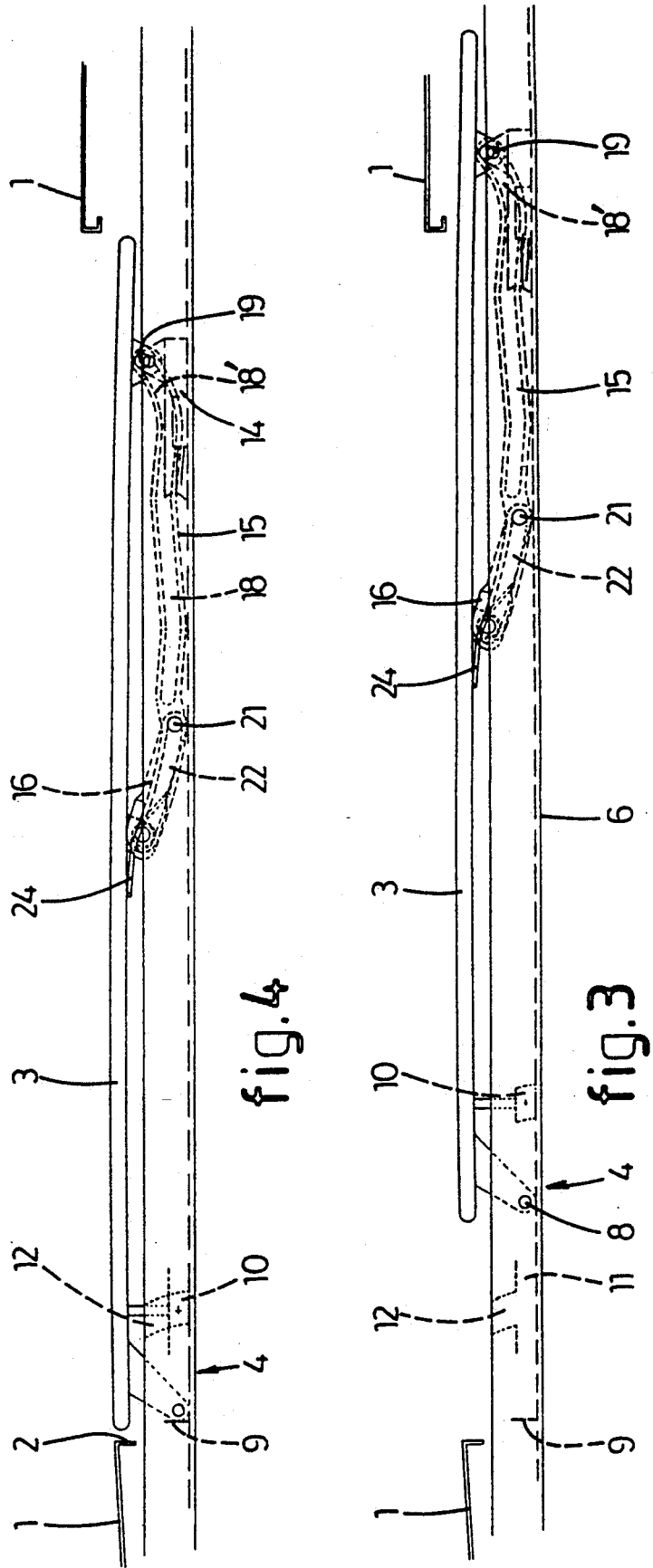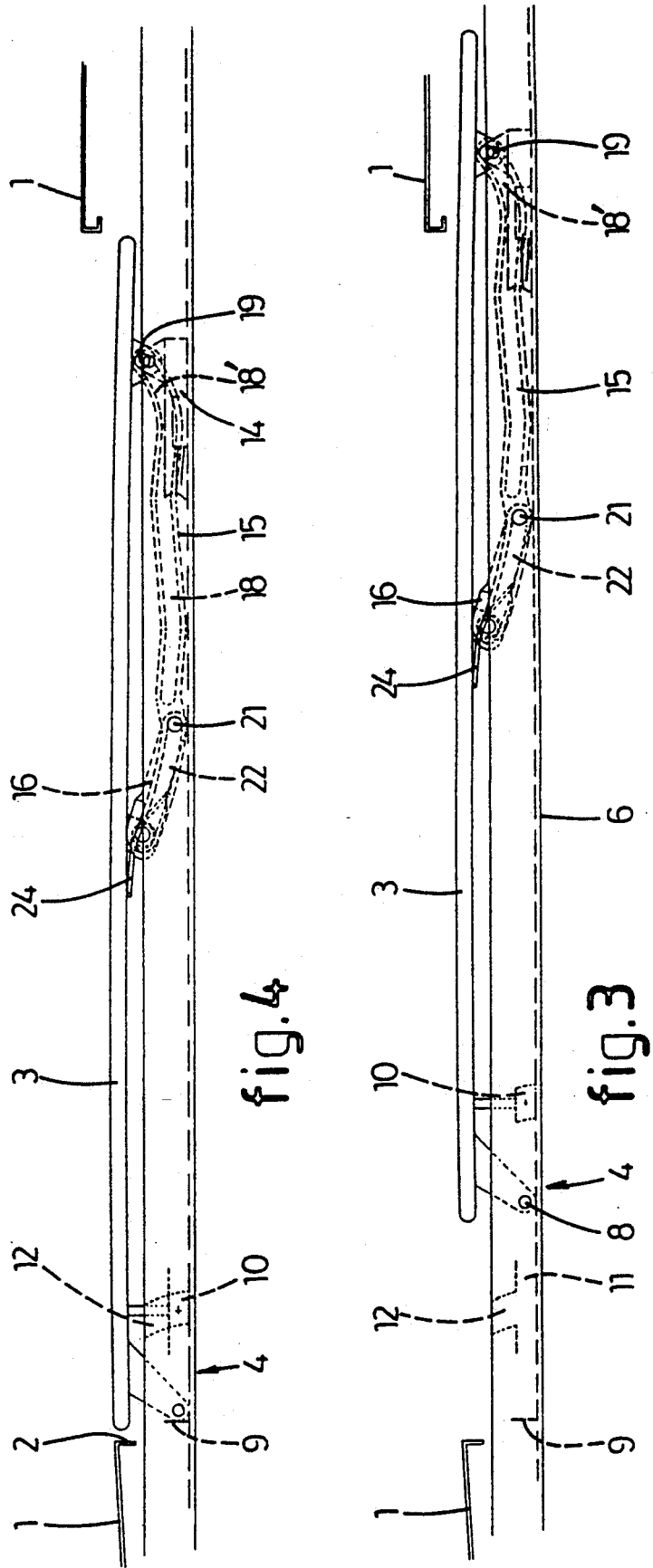

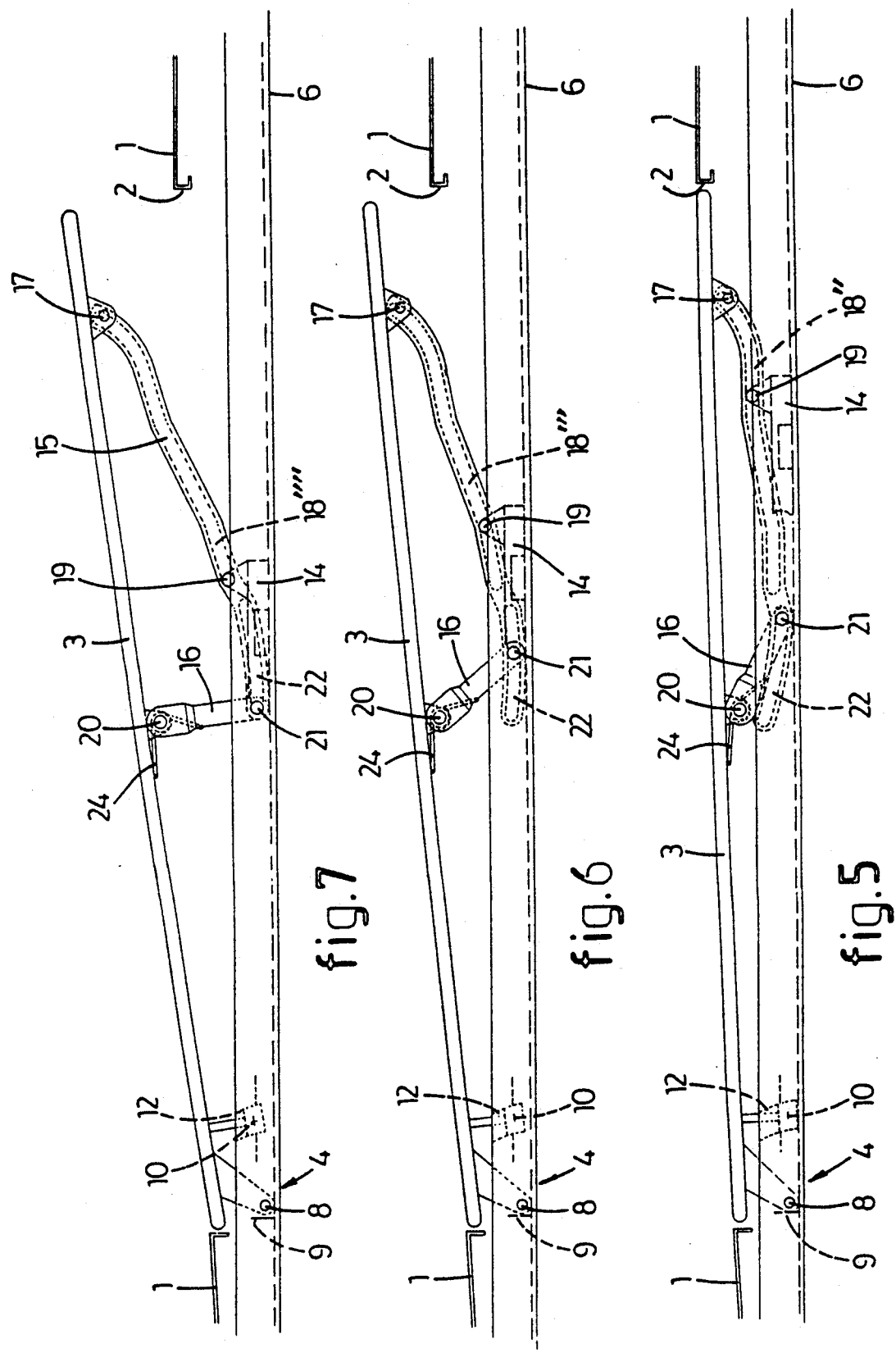

TILT-SLIDING ROOF FOR A VEHICLE

The invention relates to a tilt-sliding roof for a vehicle having an opening in its fixed roof, comprising a rigid panel closing said opening in the fixed roof in its closed position and being adapted to be moved from its closed position to a backwardly and upwardly inclined venting position on the one hand and to a backwardly slid position below the fixed roof on the other hand, said panel being supported near its front side by a front support having a transverse pivot and being displaceable within a guide rail, and at a distance behind this front support by a set-out mechanism connected with a driving slide and adapted to adjust the panel in vertical direction, an operating means engaging said driving slide which is displaceable within said guide rail to operate the panel, said set-out mechanism comprising a set-out arm arranged between the panel and the driving slide and including a guide slot, said set-out arm being connected to the panel on one end and to the driving slide on the other end in a pivotable manner, or slidable through a guide pin, respectively, and said arm swivelling in vertical direction to move the panel in vertical direction.

Such a tilt-sliding roof is known from DE-A-38 25 293. There the set-out arm consists of a straight rail arm which is pivotally connected to the panel at its rear end, and a slide piece at the upper end of a short tumbler coupled to the driving slide engages the rail arm. The tilting movement of the panel from the closed position to the upper venting position is effected by displacing the slide piece forwardly within the rail arm. In the upper venting position the slide piece is near the front pivot point of the rail arm. It will be clear that in this position the stability of the set-out mechanism is small, because when a pressure is exerted on the panel large momentum forces about the lower pivot point of the rail arm are developed. The small built-in height of the set-out mechanism is consequently obtained at the cost of the stability.

The object of the invention is to provide a tilt-sliding roof of the type mentioned in the preamble, in which the set-out mechanism for the panel not only enables a small built-in height, but also effects a stable support for the panel in all positions thereof.

For this purpose the tilt-sliding roof according to the invention is characterized in that the set-out mechanism further comprises a lever to support the panel at least in upwardly tilted positions thereof, and adjusting means for erecting said lever to tilt the panel upwardly.

This additional lever for the set-out mechanism not necessarily increases the building height thereof, because it may be swivelled to a flat position. In such flat position its stability for the purpose of supporting the panel would be small without special measurements, but right in this position in which the panel is moved downwardly, the set-out arm offers a stable support. In the upwardly tilted positions of the panel, where the stability condition of the set-out arm is deteriorating, the stability of the lever is increasing due to its more upright position, so that the support of the panel is more or less taken over by the lever. As a consequence, both in the lower and the upper tilting positions of the panel a stable support is guaranteed.

In a simple embodiment of the lever, it is pivotally connected to the panel by means of a pivot pin, and is pivotally and slidably connected to the guide rail by means of a further pivot pin, while preferably the adjusting means is formed by the driving slide engaging the lower end of the lever and being slid forwardly in order to tilt the panel upwardly, and in the upper tilting range of the panel the lower end of the lever is pushed forwardly by the driving slide.

Because the lever is only forcibly operated during a part of the tilting movement of the panel this operation may be simple and direct and no pin-slot connections between lever and driving slide are necessary to enable a long adjusting stroke of the driving slide. When the lever is not forcibly operated by the driving slide it may just follow the movements of the panel, possibly under the influence of a spring means.

Although it would principally be possible to fix the guide pin for the set-out arm to the panel, it is preferred to provide the driving slide with said guide pin engaging within the guide slot of the set-out arm.

The invention will hereafter be elucidated with reference to the drawing schematically showing an embodiment of the invention by way of example.

FIG. 3-7 are schematic side views of the tilt-sliding roof according to the invention in different positions.

Figure 1:
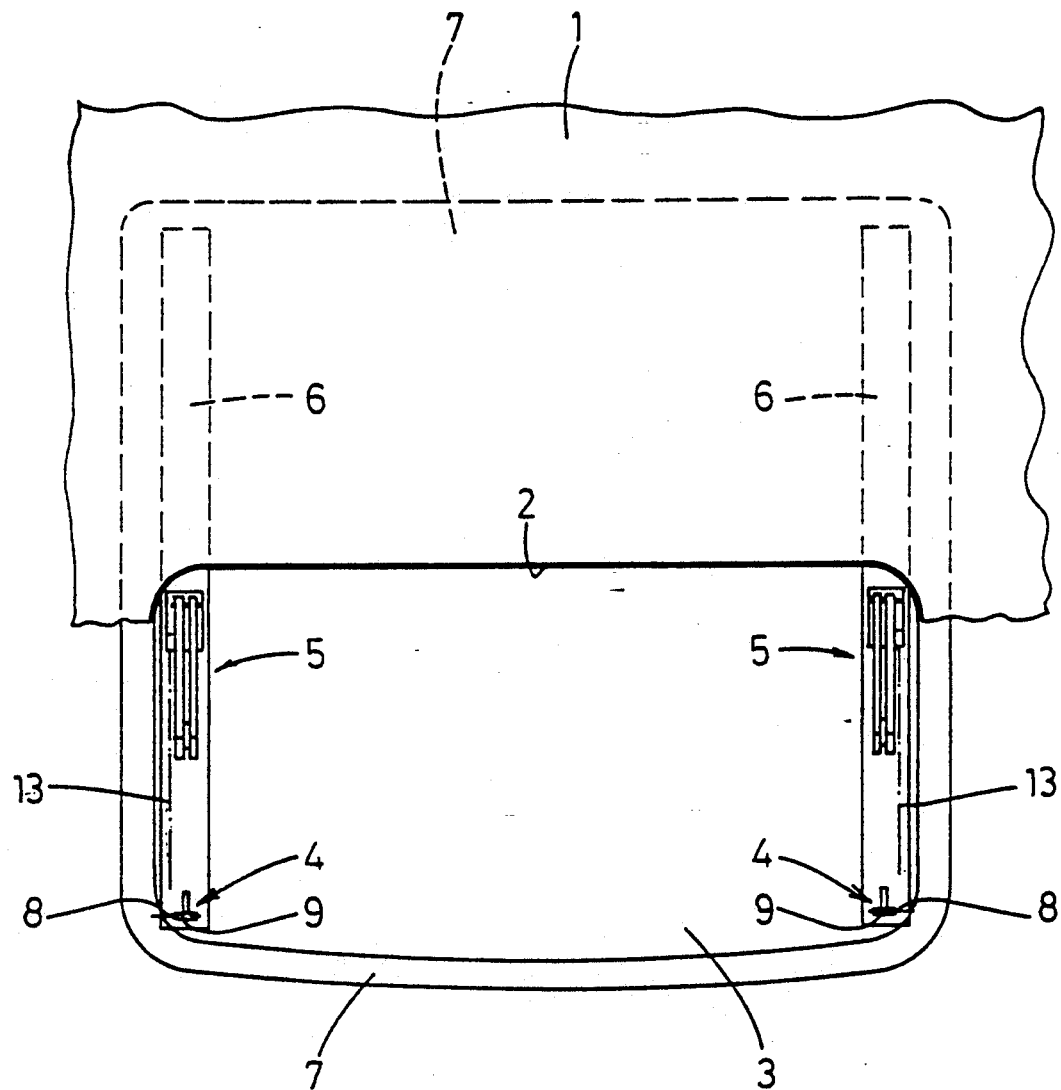
FIG. 1 is a schematic plan view of the fixed roof of a vehicle which is provided with an embodiment of the tilt-sliding roof according to the invention.
Figure 2:
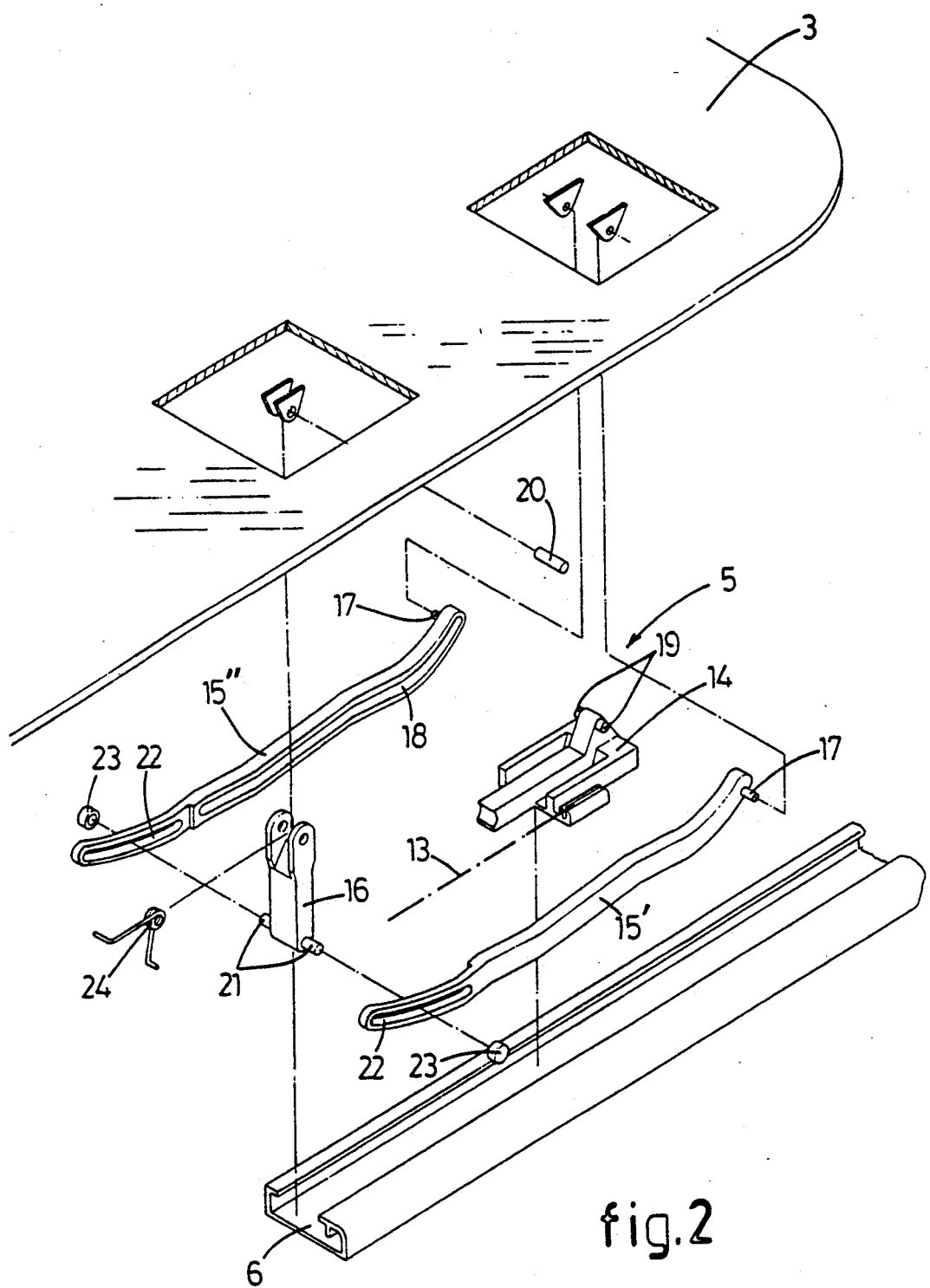
FIG. 2 is a schematic perspective exploded view showing the most important parts of the embodiment of the tilt-sliding roof of FIG. 1.

The drawing shows an embodiment of a tilt-sliding roof for a passenger car of which the fixed roof 1, a small portion of which is shown in FIGS. 1 and 3-7, is provided with an opening 2. The tilt-sliding roof comprises a rigid panel 3 which is made of metal, glass or plastic and which may or may not be transparent, said panel 3 closing the opening 2 in the fixed roof 1 in its closed position (FIG. 5). From this closed position the panel is adapted to be moved to a backwardly and upwardly inclined venting position (FIG. 7) on the one hand and to a slightly downwardly tilted and backwardly slid open position below the fixed roof 1 (FIG. 3) on the other hand.

As shown in FIG. 1, the panel 3 is supported near both side edges by a front support 4 and at a distance behind it by a set-out mechanism 5. Each front support 4 and each set-out mechanism 5 is slidably guided within a respective guide rail 6. These guide rails 6 extend below both side edges of the roof opening 2 as well as below the fixed roof i up to a distance behind said roof opening 2. Both guide rails 6 are generally arranged on a stationary frame 7 which also supports other parts of the tilt-sliding roof which are not shown.

The parts of the front support 4 and the set-out mechanism 5 on one side edge of the panel 3 are shown in FIGS. 3-7, but it must be understood that the same parts are arranged in mirror image on the other side edge of the panel 3.

The front support 4 includes a transverse pivot pin 8 about which the panel 3 may be tilted when it is adjusted in vertical direction. Furthermore, the front support 4 is constructed as or is provided with a glide shoe for the sliding motion within the guide rail 6. A stop 9 within the guide rail 6 determines the front position of the front support 4 and consequently of the panel 3.

At a distance behind the front support 4, a locking cam 10 is fixed to the panel 3, said locking cam engages within a slot 11 of the stationary guide rail 6 during the sliding motion of the panel 3 in order to prevent the panel 3 from tilting upwardly, while said locking cam 10 is lying below a recession 12 in the stationary guide rail 6 in the forwardly slid position of the panel 3 and enters said recession when the panel 3 is tilted upwardly in order to prevent the panel 3 from sliding.

The set-out mechanism 5 positioned at a distance behind each front support 4 includes a pull and push cable 13 displaceable by a manual crank or by an electric motor and serves as operating means due to its engagement with a driving slide 14 which is slidably received within the guide rail 6.

The set-out mechanism 5 includes as set-out elements a set-out arm 15 as well as a supporting lever 16. The set-out arm 15 has a double structure including transversely aligned arm parts 15' and 15''. At its rear end the set-out arm 15 is pivotally connected to the panel 3 by means of pivot pins 17. Furthermore, both arm parts 15' and 15'' are provided with an elongate guide slot 18 extending according to a certain curvature, said driving slide 14 comprising a guide pin 19 protruding to both sides, and the ends of said guide pin 19 engaging within the guide slot 18 in the parts 15' and 15'' of the set-out arm 15. Due to this double structure of the set-out arm 15 and consequently the double connection to the driving slide 14 there is created a very stable support of the set-out arm 15. The guide slots 18 have a rear curved portion 18', a further forwardly positioned straight portion 18'', a forwardly following inclined portion 18''' and a front portion 18''''.

The upper end of the supporting lever 16 is pivotally connected to the panel 3 through a pivot pin 20. The lever 16 has at its lower end a pivot pin 21 projecting to both sides and the ends of which engaging in opposite slots 22 in the front portion of both parts 15' and 15'' of the set-out arm 15. Both ends of said pivot pin 21 pass through the slots 22 and on the projecting ends of the pivot pin 21 there are positioned sliding caps 23 engaging in the stationary guide rail 6 and as a result thereof they support both the lever 16 and the set-out arm 15 in a guided manner. A torsion spring 24 is provided about the pivot pin 20 at the upper end of the lever 16 and supports against the panel in order to constantly load the lever 16 backwardly in a direction of a swivelling position in which the angle between the lever 16 and the panel 3 is at a minimum.

The operation of the tilt-sliding roof shown in the drawing is as follows.

In the downwardly displaced and backwardly slid position of the panel 3 according to FIG. 3 the guide pin 19 of the driving slide 14 is at the rear end of the guide slot 18 and the set-out arm 15 is positioned in its most flat position. Also the lever 16 is in its most flat position in which the angle between the lever 16 and the horizontal, or the panel 3 respectively, is as small as possible. As shown clearly in FIG. 3, the set-out mechanism 5 occupies only very little height when the panel is in its lowest position, so that the total height of the tilt-sliding roof, a main part of which is determined by the set-out mechanism 5, may also be small. Because the rear portion 18' of the guide slot 18 in the set-out arm 15 inclines considerably and the panel 3 is locked in its lowest position by the locking cam 10 which is in engagement with the slot 11 of the stationary guide rail 6, the driving slide 14 is unslidably connected to the set-out arm 15 and consequently to the panel 3 so that a displacement of the driving slide 14 by means of the pull and push cable 13 causes a simultaneous movement of the panel 3.

FIG. 4 shows the position of the panel in which the front support 4 thereof has abutted the stop 9 of the stationary guide rail 6 so that a further forward displacement of the panel 3 is not possible anymore. The locking cam 10, however, has arrived under the recess 12 in the stationary guide rail 6 allowing the driving slide 14 to slide with respect to the set-out arm 15 and the panel 3 because the panel 3 is allowed to tilt about the pivot pin 8 when the guide pin 19 of the driving slide 14 is moving through the curved portion 18' of the guide slot 18 in the set-out arm 15 and thereby causing the set-out arm 15 to swing upwardly and consequently to push the panel 3 upwardly at its rear side. Since upon a tilting motion of the panel 3 about the pivot pin 8 the locking cam 10 enters the recess 12, the panel 3 cannot slide anymore in longitudinal direction after its tilting displacement from the lowest position because the engagement between the locking cam 10 and the recess 12 prevents such sliding motion. Since the pivot pin 8 of the front support 4 of the panel 3 is not locked in backward direction, the configuration of the recess 12 and the movement of the locking cam 10 through it, determines the position of the pivot pin 8 during the tilting motion of the panel 3.

In the position of FIG. 5, the guide pin 19 of the driving slide 14 has arrived substantially in the middle of the right hand portion 18'' of the guide slot 18 in the set-out arm, and the panel 3 is then in its closed position in which it closes the opening 2 in the fixed roof 1 by means of seals (not shown). Between the positions of FIG. 4 and 5, the set-out arm 15 is slightly rotated upwardly whereby the set-out arm 15 swings about the pivot pin 21 having the sliding caps 23 to the lever 16, which sliding caps 23 are supported by the guide rail 6. Because the panel 3 is tilted slightly upwardly, the lever 16 is pulled to a more upright position opposite to the force of the torsion spring 24, and during this motion the pivot pin 21 at the lower end of the lever 16 is displaced slightly forwardly within the slot 22 in the set-out arm 15. As a result thereof, also the lower pivot point of the set-out arm 15 is displaced.

In the position of FIG. 6, the panel 3 has been tilted slightly upwardly from its closed position of FIG. 5 because the guide pin 19 of the driving slide 14 has moved through the portion 18''' of the guide slot 18 when the driving slide 14 is displaced forwardly. Due to the difference in height between the guide pin 19 of the driving slide 14 and the—moving—pivot point of the set-out arm 15 and the curvature of the guide slot 18, the set-out arm 15 and consequently the panel 3 are tilted upwardly with a certain transmission ratio to the driving slide 14. At a certain moment the driving slide 14 is also abutted with its concavely curved front side of the driving slide 14 to the lower end of the lever 16 so that, upon a further sliding motion of the driving slide 14, it pushes the lever 16 more upright, thereby causing a tilting motion of the panel 3 which is equal to the tilting motion effected by the set-out arm 15. Due to this, the lower pivot pin 21 of the lever 16 is again moving forwardly within the slot 22 of the set-out arm 15. Because the lever 16 is positioned more and more upright and is supported by the driving slide 14, the lever 16 is progressively taking over from the set-out arm 15 the supporting function for the panel 3.

In FIG. 7 the highest venting position of the panel 3 is obtained in which the guide pin 19 of the driving slide 14 is at the front end of the front portion 18'''' of the guide slot 18 in the set-out arm 15. There the lever 16 is pushed by the driving slide 14 into a position in which the lever 16 extends substantially perpendicular to the panel 3. The pivot pin 21 of the lever 16 is at the front end of the slot 22 in the set-out arm 15. It will be clear that in this position the lever 16 provides a very stable and solid support for the panel 3 because the forces exerted by the panel 3 onto the lever 16, which are for example caused by the driving wind, are substantially directed in the longitudinal direction of the lever 16 and may hence be fully absorbed by the lever 16. It is furthermore very favourable that the lever 16, with its pivot pin 21, is in engagement with the lower end of the set-out arm 15 because as a result there is formed a closed triangle of forces so that forces exerted by the panel 3 onto 30 the set-out arm 15 are guided back again by the lever 16 to the panel 3. The panel is also connected to the stationary guide rail 6 both through the guide pin 19 of the driving slide 14 and through the pivot pin 21 and the sliding caps 23. The torsion spring 24 causes the set-out mechanism 5 and the panel 3 to be under spring tension which prevents the structure from rattling.

It is further shown in FIG. 6 and 7 that the front support 4 of the panel 3 has moved slightly backwardly from the stop 4 during the tilting motion of the panel 3. This has happened under influence of the displacement of the locking cam 10 through the curved recess 12. As a result of this movement the forward movement of the front edge of the panel 3 is at least partially compensated so that the seal (not shown) at the front edge of the panel 3 cannot be damaged.

The movement of the panel 3 from the position of FIG. 7 to the position of FIG. 3 is effected completely in reversed sense, with only that difference that the torsion spring 24 causes the return movement of the lever 16.

From the foregoing it will be clear that the set-out mechanism 5 of the tilt-sliding roof according to the invention as shown necessitates only a very small building height and consequently a small built-in height of the total tilt-sliding roof on the one hand, while it also provides a very stable support of the panel 3 on the other hand, whereby the set-out arm 15 effects the support of the panel 3 in the lower positions thereof, while the lever 16 takes over a main part of the support of the panel in the higher positions. As a result, the support of the panel 3 has no weak positions. Since the lever 16 has to be operated only during a part of the tilting motion of the panel, this operation may be relatively simple.

The invention is not restricted to the embodiment shown in the drawing and described herein before, which may be varied in different manners within the scope of the invention.

I claim:

1. A tilt-sliding roof for a vehicle having an opening (2) in it fixed roof (1), comprising: a frame joined to the fixed roof adjacent the opening, the frame having a guide rail (6); a rigid panel (3) closing said opening in the fixed roof in the closed position and being adapted to be moved from the closed position to a backwardly and upwardly inclined first venting position and from the closed position to a backwardly slid second open position below the fixed roof; a front support joined to a front portion of said panel (3), said front support having a transverse pivot (8) and being displaceable within the guide rail (6); and a set-out mechanism (5) joined to the panel (3) at a spaced apart distance from the front support, the set-out mechanism (5) adjusting movement of the panel (3) from the closed position, said set-out mechanism comprising a set-out arm (15) joined to the panel (3) and having a first slot (18); a driving slide (14) having a first guide pin (19) slidably joined to the set-out arm (15) with the first slot (18), the driving slide (14) slidable on the guide rail (6); an operating means for moving said driving slide (14) on said guide rail (6) to operate the panel (3); a lever (16) pivotally connected to the panel (3) by means of a first pivot pin (20) to support the panel (3) at least in upwardly tilted positions thereof and pivotally connected to a front portion of the set-out arm; and means for erecting said lever (16) to tilt the panel (3) upwardly.

2. The tilt-sliding roof according to claim 1, wherein the lever (16) includes a second guide pin (21), the second guide pin (21) being pivotally and slidably connected to the guide rail (6).

3. A tilt-sliding roof according to claim 1, wherein the means for erecting said lever is formed by the driving slide (14) engaging the lower end of the lever (16) and being slid forwardly during movement of the panel (3) to the upwardly inclined first venting position.

4. A tilt-sliding roof according to claim 1, wherein the set-out arm (15) is pivotally connected to the panel (3) by a second pivot pin (17), which is positioned backwardly of the first pivot pin (20) of the lever (16).

5. A tilt-sliding roof according to claim 1, wherein the lever (16) and the set-out arm (15) are connected to each other by means of a pin slot connection.

6. A tilt-sliding roof according to claim 5, wherein the pin slot connection comprises a second guide pin (21) at the lower end of the lever (16) connected to a second slot (22) provided at a front end of the set-out arm (15).

7. A tilt-sliding roof according to claim 1, and further comprising spring means (24) joined to the lever (16) for opposing movement of the lever (16) caused by the means for erecting said lever.

8. A tilt-sliding roof according to claim 1, wherein the lever (16) is oriented substantially perpendicular to the panel (3) when the panel is in the upward inclined first venting position.

9. A tilt-sliding roof according to claim 1, and further comprising a cam (10) mounted to the panel (3) and a guide means connected to the stationary guide rail (6) such that, in backwardly displaced positions of the panel (3) an upwardly tilting movement thereof is prevented by the cam contacting a first portion of the guide means and, in upwardly tilted positions of the panel (3), and undesired backward displacement thereof is prevented by the cam contacting a second portion of the guide means.

10. A tilt-sliding roof for a vehicle having an opening (2) in it fixed roof (1), comprising: a frame joined to the fixed roof adjacent the opening, the frame having a guide rail (6); a panel (3) closing said opening in the fixed roof in the closed position and being adapted to be moved from the closed position to a backwardly and upwardly inclined first venting position and from the closed position to a backwardly slid second open position below the fixed roof; a front support joined to a front portion of said panel (3), said front support having a transverse pivot (8) and being displaceable within the guide rail (6); and a set-out mechanism (5) joined to the panel (3) at a spaced apart distance from the front support, the set-out mechanism (5) adjusting movement of the panel (3) from the closed position, said set-out mechanism comprising a set-out arm (15) joined to the panel (3); a driving slide (14) slidable on the guide rail (6); an operating means for moving said driving slide (14) on said guide rail (6) to operate the panel (3); a lever (16) pivotally connected to the panel (3) by means of a first pivot pin (20) to support the panel (3) at least in upwardly tilted positions thereof, the lever further including a guide pin (21) to pivotally and slidable connect both the guide rail (6) to the lever (16) and the set-out arm (15) to the lever (16); and means for erecting said lever (16) to tilt the panel (3) upwardly.

11. A tilt-sliding roof according to claim 10, wherein the guide pin (21) at the lower end of the lever (16) engages a slot (22) at the front end of the set-out arm (15).

* * * * *

UNITED STATES PATENT AND TRADEMARK OFFICE
CERTIFICATE OF CORRECTION

PATENT NO.   : 5,259,662
DATED        : November 9, 1993
INVENTOR(S)  : Johannes N. Huyer It is certified that error appears in the above-indentified patent and that said Letters Patent is hereby corrected as shown below:

Col. 6, Line 54, delete "it", insert "its"

Signed and Sealed this

Twenty-sixth Day of April, 1994

Attest:

BRUCE LEHMAN

*Attesting Officer*     *Commissioner of Patents and Trademarks*